June 27, 1961
J. E. STRAUB ET AL
2,989,871
TORQUE SOLENOID
Filed Sept. 6, 1955
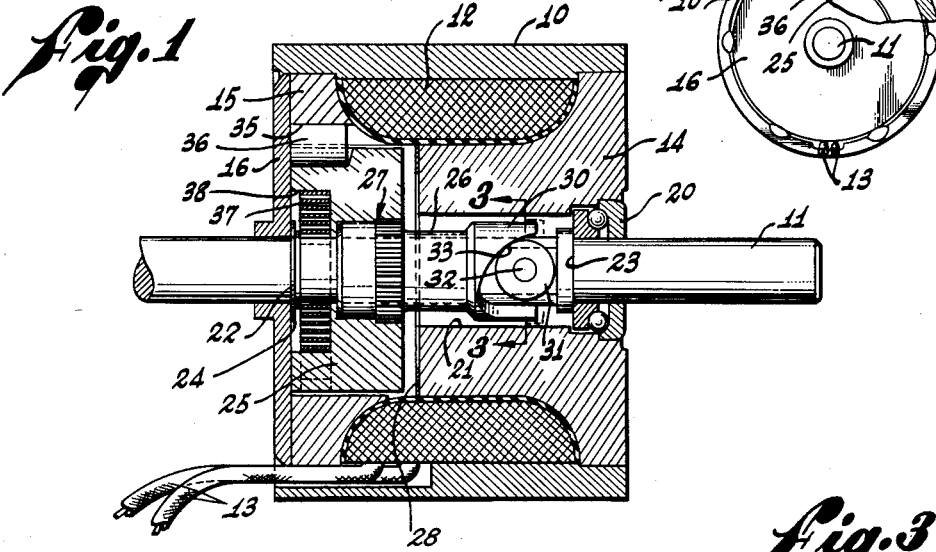
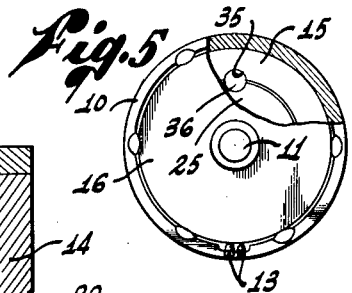
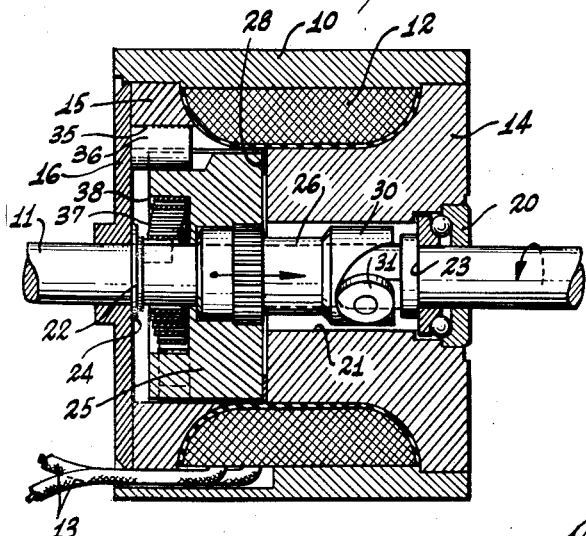
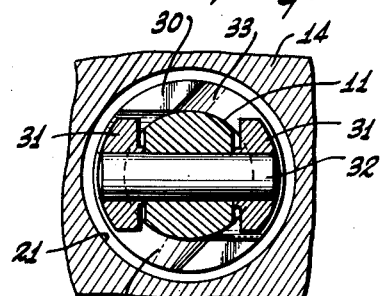
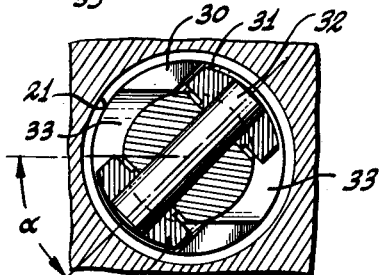
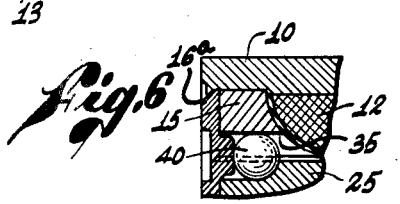
INVENTORS
JOSEPH E. STRAUB
LEX W. HUBBARD JR.
BY
Fulwider Mattingly & Huntley
ATTORNEYS

2,989,871
TORQUE SOLENOID
Joseph E. Straub, Manhattan Beach, and Lex W. Hubbard, Jr., Los Angeles, Calif., assignors, by mesne assignments, to Illinois Tool Works, Chicago, Ill., a corporation of Illinois
Filed Sept. 6, 1955, Ser. No. 532,681
12 Claims. (Cl. 74—99)

This invention relates generally to electrical solenoids, and more particularly to a solenoid whose output shaft is designed to provide rotary motion rather than linear motion.

In its simplest form, a solenoid consists of a helical winding about a magnetic plunger that is adapted to move linearly within the winding. When the winding is energized, the plunger assumes a predetermined position within the winding, and if the plunger is urged to some other position, the movement of the plunger as the coil is energized and de-energized can be used to operate various devices.

However, in many cases linear movement is not desired, but instead rotary movement is needed. While a rachet or crank can often be used to convert the linear motion to rotational movement, in many instances this is not practical. Thus in many controlled devices, a member is to be rotated between two limiting positions, and a simple and compact operator is highly desirable. A solenoid which rotates a shaft, rather than reciprocating a plunger, is one form of operator that meets these requirements very satisfactorily, and we refer to such a device as a torque solenoid.

While there are some such solenoids presently available, in general these act to move the output shaft axially as well as to rotate it, and in many applications, all axial movement is to be avoided.

It is therefore a major object of our invention to provide a solenoid whose output shaft is rotated without being axially moved.

Another object of our invention is to provide a torque solenoid whose output torque may be maintained substantially constant throughout the entire range of movement of the shaft, or may be varied as required.

It is a further object of our invention to provide a torque solenoid of simple and reliable construction that easily lends itself to modern assembly techniques so that large quantities of the device may be manufactured and sold at a relatively small cost.

Still another object of our invention is to provide such a solenoid in which the entire device is enclosed within a single housing, thereby minimizing the effects of external conditions, such as dust, etc.

It is a still further object of our invention to provide such a torque solenoid having a minimum of moving parts and thus being capable of giving long trouble-free service.

These and other objects and advantages of our invention will become apparent from the following description of a preferred form thereof, and from the drawings illustrating that form in which:

FIGURE 1 is an axial sectional view of the torque solenoid, showing the various parts thereof in their normal or de-energized position;

FIGURE 2 is an axial sectional view similar to FIGURE 1 but with the parts in the positions they assume when the solenoid is energized;

FIGURE 3 is an enlarged fragmentary cross sectional view taken on the line 3—3 of FIGURE 1 and showing the cam and rollers in their normal or de-energized positions;

FIGURE 4 is a view similar to FIGURE 3 but showing the cam and rollers in their energized positions;

FIGURE 5 is an end view of the solenoid to a reduced scale, partially broken away, and taken at the lefthand end in FIGURE 1; and FIGURE 6 is a fragmentary sectional view of an optional form of restraining means for the armature.

Referring now to the drawings, and particularly to FIGURE 1 thereof, our torque solenoid includes a generally cylindrical housing or shell 10, which may be provided with any suitable mounting means (not shown), with an axially extending non-magnetic shaft 11 projecting from either end of the shell. The shell 10 is of a magnetic material, such as soft iron, and located within the shell is a helical coil 12 having leads 13 by means of which an electrical circuit may be completed through the coil to energize the latter. Co-axial with the coil 12 is a fixed magnetic core 14 that fits within the coil and is flared at one end to engage the shell 10 so that a path of low magnetic reluctance is provided for the flux generated by the coil. It will be noted that the fixed magnetic core 14 does not extend completely through the shell 10, but instead extends only part way.

At the other end of the housing 10 there is mounted a stator ring 15 that is likewise co-axial with the shell and extends inwardly therefrom to complete the closure and encasement of the major portion of the coil 12. The stator ring 15, like the fixed magnetic core 14 and the shell 10 is formed of a magnetic material having a low reluctance. A cover or end plate 16, preferably of a non-magnetic material and hereinafter described in greater detail, extends across the stator ring 15 and is staked or otherwise suitably held to the shell 10.

The output shaft 11 is axially located with respect to the shell 10 and is supported at one end by a bearing 20 mounted in the fixed magnetic core 14. An axial bore 21 extends through the fixed magnetic core 14, and the shaft 11 passes through this bore and is supported at the other end of the shell 10 by a bearing means such as provided by a boss 22 on the end plate 16. A shoulder 23 is formed on the shaft 11 to bear against one portion of the bearing 20, this bearing being adapted to take both radially and axially directed loads, and a flange or retaining ring 24 is located on the shaft adjacent the inner surface of the end plate 16 to prevent axial movement of the shaft in a direction toward the left in FIGURE 1, whereby the shoulder 23 would move away from the bearing 20. The shaft 11 is thus held against axial movement, while being free to rotate.

Between the inner end of the fixed magnetic core 14 and the end plate 16 is an annular space extending between the shaft 11 and the inner surface of the stator ring 15. This space has a diameter slightly less than the inner diameter of the coil 12, and in it we place an armature 25. As shown in the drawings, the diameter of the armature 25 is substantially equal to the inner diameter of the stator ring 15, and the axial length of the armature is somewhat less than the distance between the fixed magnetic core 14 and the end plate 16. Thus, axial movement of the armature 25 is possible when the coil 12 is energized and de-energized. By suitable means, such as a non-magnetic shim or spacer 28, the armature 25 is kept from touching the core 14 so that there is a magnetic gap between these members at all times.

A tubular member 26 surrounds the output shaft 11 and is freely slidable thereon, and at one end the tubular member is rigidly connected to the armature 25 so that neither axial nor rotational movement of the tubular member with respect to the armature is possible. The tubular member 26 is formed to provide a high reluctance to magnetic lines of force, as by the choice of a suitable material, a particular shape, or both. The nature of the load imposed upon the output shaft is such that a strong connection may be made between the tubular member 26 and the armature 25 by means of abutting shoulders and a knurled section, all as indicated at 27, though other suitable means may be used.

The opposite end of the tubular member 26 is provided with a cam section 30 that cooperates with a pair of rollers 31 mounted upon the output shaft 11. As best seen in FIGURES 3 and 4, the shaft 11 is preferably flattened on diametrically opposite sides adjacent the bearing 20, and a pin or other supporting means 32 holds the rollers 31 for rotation about the axis of the pin. In the case of very small solenoids, where physical size discourages their use, the rollers 31 may be omitted and the pin 32 allowed to bear against the cam 30. The cam 30 is of the crown type in which a cut of varying axial depth forms a cam surface 33 upon which the rollers 31, or the pin 32, acting as the cam followers, ride. The shape of the cam surface 33 is such that, since the shaft 11 and the rollers 31 are held against axial movement, non-rotational movement of the armature 25 toward the fixed magnetic core 11 will produce a linear movement of the cam that causes rotation of the shaft as the rollers follow along the cam surface. While it is possible to give the cam surface 33 a uniform slope, so that equal incremental movements of the armature cause equal incremental angular movements of the shaft 11 in all positions of the armature, generally this is not desirable. Thus, at the beginning of the armature stroke, the force that is developed by the armature is less than that which is developed just before the end of its inward movement. Consequently, it is usually desirable to have the cam surface 33 shaped to compensate for this, and thus the surface is comparatively steep near the start of the stroke. In this way, a substantially uniform torque can be developed over the entire movement of the shaft if this is desired.

In a device of this character, it is clearly desirable to keep the reluctance of the magnetic circuit to a minimum, and consequently all possible air gaps should be eliminated or reduced to a minimum. By proper manufacturing procedures, the junction between the fixed magnetic core 14 and the shell 10 may be made without any appreciable air gap, as may the junction between the shell 10 and the stator ring 15. The gap between the armature 25 and the fixed magnetic core 14 is necessary for the movement of the armature and the operation of the device, but there remains a gap between the stator ring 15 and the armature 25 that must be kept as small as possible.

While various methods may be used to accomplish this, we have found that the simplest and most economical is to make the armature 25 and the stator ring 15 with a minimum of clearance therebetween, and to then apply a dry surface lubricant, as molybdenum disulfide, or other suitable material, on the two adjacent surfaces. Such a lubricant, which is only a thousandth of an inch thick or less, insures freedom of movement of the armature while still maintaining a minimum separation between the armature and the stator ring 15. The lubricant also permits the use of so-called "dead soft" magnetic materials, magnetically desirable but subject to excessive wear and abrasion under other conditions.

As previously mentioned, for the proper operation of our device it is important that the armature 25 be held against rotation. While this can be done in a number of ways, such as by making the armature of non-circular shape, to prevent tipping or cocking of the armature and its consequent binding, it is preferable to have the armature symmetrical and balanced. Thus, we find that a circular armature 25 that makes a close fit with the stator ring 15 and is surface lubricated, as described, is a very satisfactory form of construction if suitable means are provided to prevent rotation between the armature and the stator ring. One of the most satisfactory methods of preventing such rotation is to drill or otherwise form a hole 35 whose axis is parallel to the axis of the shaft 11 and located substantially on the line separating the stator ring 15 from the armature 25 so that the hole itself extends into both of these members. In the hole 35 we place a cylindrical plug 36 of nylon or other material having suitable bearing qualities, and the plug, since it is substantially the same diameter as the hole 35, holds the armature 25 against rotational movement with respect to the stator ring 15, and also with respect to the shaft 11, while permitting axial movement with respect to both the stator ring and the shaft.

To return the armature 25 to its original position after the coil 12 has been energized, we provide a spring 37 that interconnects the armature 25 and the shaft 11. Preferably, the spring 37 is located within a recess 38 formed in the end of the armature 25 adjacent the end plate 16, and the spring takes the form of a spiral formed of strip material, with the outer end of the spring anchored to the armature 25 and the inner end anchored to the shaft 11. The spring is so wound and connected as to resist the rotation of the shaft 11 caused by the operation of the cam member 30, and thus, when the coil 12 is energized, the armature is driven forward but held against rotation, while the shaft 11 is rotated against the urging of the spring, but is held against axial movement. As a result, the spring 37 is deflected as indicated in FIGURE 2, where it is seen in addition to being wound tighter by the rotation of the shaft 11, the spring is also displaced out of its plane by the axial but non-rotational movement of the armature 25. By pre-loading the spring 37, it is possible to have any reasonable proportion of the energy of the solenoid available for the forward or advance movement, caused by the energization of the coil 12, while the remainder of the energy is available for the return movement. Thus, in some instances a fairly large amount of torque must be available for advancing a member, while the return movement requires substantially no torque. Such an arrangement is sometimes encountered in a ratcheting-type of device. In other forms of apparatus a substantially equal amount of torque is necessary for movement in each direction. As another limiting case, very little torque may be required on the advancement, but a great amount of torque may be required for the return portion of the movement. All of these variations, and intermediate ones, are available by properly pre-loading the spring 37.

In a similar manner, it is possible to control the angular movement α of the shaft 11 in moving from one limiting position to the other. By changing the shape of the cam surface 33, it is possible to cause the rollers to follow a path of, for example, 20°, or to cause them to follow a path of, for example, 50°. It will be appreciated, of course, that the change of cam shape to produce the different amounts of rotation produces a corresponding change in the torque delivered to the output shaft 11. Essentially the entire power for the rotation of the shaft 11 is secured from the movement of the armature 25, and while this power may be concentrated in a relatively small angle, or extended over a larger angle, the same amount of work will be done in each case.

One advantage of using the cylindrical nylon plug 36 is that the length of the cylinder tends to keep the armature 25 properly aligned and oriented within the stator ring 15 without any tipping or cocking. Usually a plurality of such plugs 36, spaced equal distances around the circumference of the armature 25, are used, but under certain conditions of operation, a single plug may be sufficient. As an alternative for of construction, spheres, such as the balls from ball bearings, may be used instead of the cylindrical plugs.

As indicated in FIGURE 6, if balls 40 are to be used instead of the plugs 36, all of the elements are formed in the same manner as previously described, with the exception of the cover plate 16. The balls 40, of the same diameter as the holes 35, are inserted in the holes, and a cover plate 16a, similar to the cover plate 16, is then indented by a suitable process, such as coining, to produce a protuberance of the plate that bears against the outermost surface of the ball when the armature is in its de-energized position. At this same time, the innermost surface of the ball bears against the bottom of the hole 35 in the armature 25, so that the ball is precisely located.

Thereafter, when the armature 25 is moved inwardly, toward the fixed magnetic core 14, the ball will move a distance substantially equal to half the distance of the movement of the armature, and will thereafter be returned to its original position when the coil 12 is de-energized. In this way, all of the balls are indexed to a predetermined axial position within the shell 10 at each operation of the torque solenoid, and the tipping or cocking of the armature 25 is prevented.

From the foregoing, it will be seen that the functions of the plugs 36 and the balls 40 is to prevent rotation of the armature 25 and to keep it from becoming jammed or wedged within the stator ring 15. In this connection, the use of the surface lubricant is of great assistance, and the maximum power is available at the output shaft 11. It will also be recognized that the herein described torque solenoid has as one of its principle features the fact that the output shaft 11 is not moved axially with respect to the shell 10, but instead is held against axial movement while being rotated by the operation of the armature 25, cam 30, and rollers 31. The construction is such that the inertia of moving parts may be held to a very low value, a great advantage in many applications, and the device has the ability to take side or radial loads far in excess of other comparable devices.

From the foregoing, it will be seen that we have provided a torque solenoid fully capable of securing the advantages and achieving the objects heretofore set forth. Clearly, modifications may be made in the device that do not depart from the broad scope of our invention, and while we have shown a preferred embodiment of our invention, we do not wish to be restricted to the particular form or arrangement of parts herein described and shown, except as limited by our claims.

We claim:

1. A torque solenoid of the character described which includes: a coil adapted to be energized by an electric current; a core fixedly mounted within said coil; an armature normally axially spaced from said core and aligned therewith but linearly movable toward said core upon energization of said coil; magnetic circuit means completing a magnetic circuit from said core, around said coil, to said armature; an output shaft extending through said core, rotatable about its axis but held against axial movement; and cam means connecting said armature to said output shaft, said cam means comprising a crown cam and a follower and acting to convert linear motion of said armature to rotary motion that is applied to said shaft.

2. A torque solenoid of the character described which includes: a coil adapted to be energized by an electric current; a magnetizable core fixedly mounted within said coil; an armature normally axially spaced from said core and aligned therewith but linearly movable toward said core upon energization of said coil; magnetic circuit means completing a magnetic circuit from said core, around said coil, and to said armature, there being a minimal radial gap between said circuit means and said armature at all times; restraining means between said circuit means and said armature, acting to limit said armature to axial movement and preventing rotational movement; an output shaft extending through said core, rotatable about its axis but held against axial movement; and cam means connecting said armature to said output shaft, said cam means acting to convert oscillatory linear motion of said armature to oscillatory rotary motion that is applied to said shaft.

3. A torque solenoid of the character described which includes: a coil adapted to be energized by an electric current; a magnetizable core fixedly mounted within said coil; an armature normally axially spaced from said core and aligned therewith but linearly movable toward said core upon energization of said coil; magnetic circuit means completing a magnetic circuit from said core, around said coil, and to said armature, there being a minimal radial gap between said circuit meants and said armature at all times; restraining means between said circuit means and said armature, acting to limit said armature to axial movement and preventing rotational movement; an output shaft; bearing means supporting said shaft generally axially with respect to said core and for rotation with respect thereto, but holding said shaft against axial movement; and cam means connecting said armature to said output shaft, said cam means acting to convert oscillatory linear motion of said armature to oscillatory rotary motion that is applied to said shaft.

4. A torque solenoid of the character described which includes: a coil adapted to be energized by an electric current; an armature adjacent said coil and adapted to be moved axially by the energization thereof from a first position to a second position; magnetic circuit means completing a magnetic circuit from said armature, around said coil, and back to said armature, said armature being separated from said circuit means by a radial and an axial gap; restraining means between said circuit means and said armature acting to prevent cocking of said armature and the consequent binding thereof against said circuit means; a surface lubricant film between said armature and said circuit means in said radial gap, said gap being a minimum permitting free movement of said armature; an output shaft; and means connecting said output shaft to said armature for movement of said shaft by said armature and including a crown cam and a cooperating follower.

5. A torque solenoid of the character described which includes: a coil adapted to be energized by an electric current; a magnetizable core fixedly mounted within said coil; an armature normally axially spaced from said core and aligned therewith but linearly movable toward said core upon energization of said coil; magnetic circuit means completing a magnetic circuit from said core, around said coil, and to said armature, there being a minimal radial gap between said circuit means and said armature at all times; restraining means between said circuit means and said armature, acting to limit said armature to axial movement and preventing rotational movement; a surface lubricant film between said armature and said circuit means in said radial gap, said gap being a minimum permitting free movement of said armature; an output shaft rotatable about its axis but held against axial movement; and cam means connecting said armature to said output shaft, said cam means comprising a crown cam and a cooperating follower and acting to convert linear motion of said armature to rotary motion that is applied to said shaft.

6. A torque solenoid of the character described which includes: a coil adapted to be energized by an electric current; an armature adapted to be linearly moved in a direction axially of said coil from a first position adjacent said coil to a second position more closely adjacent said coil by the energization of said coil, said armature being held against rotational movement; magnetic circuit means forming a substantially complete magnetic circuit from said armature, around said coil, and back to said armature, at least a portion of said magnetic circuit means being axially aligned with said armature and extending axially into said coil and terminating so as to be adjacent said armature when the latter is in its first position and more closely adjacent to said armature when the latter is in its second position; means defining a passageway extending axially of said coil through said armature and through said portion of said magentic circuit means; an output shaft extending through said passageway; and cam means interconnecting said armature and said output shaft, said cam means including a crown cam and cooperating follower mounted axially of said output shaft and positioned within said passageway, said cam means acting to convert linear motion of said armature to rotary motion that is applied to said shaft.

7. A torque solenoid of the character described which includes: a coil adapted to be energized by an electric current; an armature adapted to be linearly moved in a direction axially of said coil from a first position adjacent said coil to a second position more closely adjacent said coil by the energization of said coil, said armature being held against rotational movement; magnetic circuit means forming a substantially complete magnetic circuit from said armature, around said coil, and back to said armature, said magnetic circuit means including a core fixed with respect to and extending axially into said coil and terminating so as to be adjacent said armature when the latter is in its first position and more closely adjacent to said armature when the latter is in its second position; means defining a passageway extending axially of said coil through said armature and through said core; an output shaft extending through said passageway; and cam means interconnecting said armature and said output shaft, said cam means including a crown cam and cooperating follower mounted axially of said output shaft and positioned within said passageway, said cam means acting to convert linear motion of said armature to rotary motion that is applied to said shaft.

8. A torque solenoid of the character described which includes: a coil adapted to be energized by an electric current; an armature adapted to be linearly moved in a direction axially of said coil from a first position adjacent said coil to a second position more closely adjacent said coil by the energization of said coil; means for holding said armature against rotational movement; magnetic circuit means forming a substantially complete magnetic circuit from said armature, around said coil, and back to said armature, said magnetic circuit means including a core fixed with respect to said coil and extending axially into said coil and terminating so as to be adjacent said armature when the latter is in its first position and more closely adjacent to said armature when the latter is in its second position; means defining a passageway extending axially of said coil through said armature and through said core; an output shaft extending through said passageway; and cam means interconnecting said armature and said output shaft, said cam means including a crown cam and cooperating follower mounted axially of said output shaft and positioned within the passageway through said core, said cam means acting to convert linear motion of said armature to rotary motion that is applied to said shaft.

9. A torque solenoid of the character described which includes: a coil adapted to be energized by an electric current; an armature comprising an annular body having an outer diameter such as to permit entry thereof into said coil, said armature being adapted to be linearly moved in a direction axially of said coil from a first position adjacent said coil to a second position more closely adjacent and within said coil by the energization of said coil; means for holding said armature against rotational movement; magnetic circuit means forming a substantially complete magnetic circuit from said armature, around said coil, and back to said armature, said magnetic circuit means including a portion surrounding said armature in sliding relation thereto, and a core fixed with respect to said coil and extending axially into said coil and terminating so as to be adjacent said armature when the latter is in its first position and more closely adjacent to said armature when the latter is in its second position; means defining a passageway extending axially of said coil through said armature and through said core; an output shaft extending through said passageway; and cam means interconnecting said armature and said output shaft, said cam means including a crown cam and cooperating follower mounted axially of said output shaft and positioned within the passageway through said core, said cam means acting to convert linear motion of said armature to rotary motion that is applied to said shaft.

10. A torque solenoid of the character described which includes: a coil adapted to be energized by an electric current; an armature comprising an annular body having an outer diameter such as to permit entry thereof into said coil, said armature being adapted to be linearly moved in a direction axially of said coil from a first position adjacent said coil to a second position more closely adjacent and within said coil by the energization of said coil; means for holding said armature against rotational movement; magnetic circuit means forming a substantially complete magnetic circuit from said armature, around said coil, and back to said armature, said magnetic circuit means including a portion surrounding said armature in sliding relation thereto, and a core fixed with respect to said coil and extending axially into said coil and terminating so as to be adjacent said armature when the latter is in its first position and more closely adjacent to said armature when the latter is in its second position; means defining a passageway extending axially of said coil through said armature and through said core; an output shaft extending through said passageway and rotatable therein; means holding said output shaft against axial movement; and cam means interconnecting said armature and said output shaft, said cam means including a crown cam formed in a tubular body fixed to said armature and extending in slidable relation upon said output shaft into the passageway in said core, and cooperating follower means carried by said output shaft, within said passageway through said core, said cam means acting to convert linear motion of said armature to rotary motion that is applied to said shaft.

11. An electromagnetically operated rotary actuator comprising an electromagnet, an armature mounted for axial movement toward said electromagnet and restrained against rotary movement relative thereto, a member mounted for rotary movement relative to said armature, and means operable to impart rotary movement to said member in response to axial movement of said armature toward said electromagnet.

12. An electromagnetically operated rotary actuator comprising an electromagnet, an armature mounted for axial movement toward said electromagnet and restrained against rotary movement relative thereto, a first member fast with said armature for axial movement therewith, a second member arranged for rotary movement relative to said armature, one of said members being provided with an inclined surface, rotatable means operatively associated with the other member and disposed in rolling engagement with said inclined surface to impart rotary movement to said second member upon axial movement of said armature and first member.

References Cited in the file of this patent

UNITED STATES PATENTS

| | | |
|---|---|---|
| 1,470,687 | Clark | Oct. 16, 1923 |
| 1,493,259 | Green | May 6, 1924 |
| 1,619,677 | Pierce | Mar. 1, 1927 |
| 1,723,607 | Dominguez | Aug. 6, 1929 |
| 1,835,832 | Whalen | Dec. 8, 1931 |
| 2,110,033 | Bostick | Mar. 1, 1938 |
| 2,566,571 | Leland | Sept. 4, 1951 |

FOREIGN PATENTS

| | | |
|---|---|---|
| 431,237 | Great Britain | July 3, 1935 |